(12) United States Patent (10) Patent No.: US 7,456,525 B2
Rhodes et al. (45) Date of Patent: Nov. 25, 2008

(54) MULTI-OUTPUT POWER SUPPLY DEVICE FOR POWER SEQUENCING

(75) Inventors: Sean Rhodes, Carlisle (CA); Robert G. Czychun, Brighton (CA); Dikran Yaldizciyan, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 920 days.

(21) Appl. No.: 10/887,939

(22) Filed: Jul. 9, 2004

(65) Prior Publication Data

US 2006/0010333 A1    Jan. 12, 2006

(51) Int. Cl.
*H02J 1/00* (2006.01)
(52) U.S. Cl. .................................................. 307/85
(58) Field of Classification Search ................ 307/85
See application file for complete search history.

(56) References Cited

U.S. PATENT DOCUMENTS

| | | | |
|---|---|---|---|
| 4,961,128 A | 10/1990 | Bloom | |
| 5,654,879 A | 8/1997 | Lopez et al. | |
| 5,886,508 A | 3/1999 | Jutras | |
| 5,949,222 A | 9/1999 | Buono | |
| 5,949,671 A | 9/1999 | Lee et al. | |
| 6,005,377 A * | 12/1999 | Chen et al. | 323/283 |
| 6,239,585 B1 | 5/2001 | Buono | |
| 6,396,169 B1 * | 5/2002 | Voegeli et al. | 307/52 |
| 6,429,632 B1 | 8/2002 | Forbes et al. | |
| 6,636,022 B2 | 10/2003 | Sluijs | |
| 6,661,119 B2 | 12/2003 | Liu et al. | |
| 6,661,209 B2 | 12/2003 | Patel | |
| 6,956,752 B2 * | 10/2005 | Miermans | 363/85 |
| 7,105,947 B1 * | 9/2006 | Marshall et al. | 307/28 |
| 2001/0033156 A1 | 10/2001 | Buono | |
| 2002/0093315 A1 | 7/2002 | Sluijs | |
| 2002/0104031 A1 | 8/2002 | Tomlinson et al. | |
| 2003/0111909 A1 | 6/2003 | Liu et al. | |
| 2003/0112647 A1 | 6/2003 | Liu et al. | |
| 2003/0227280 A1 | 12/2003 | Vinciarelli | |
| 2004/0179383 A1 * | 9/2004 | Edo et al. | 363/111 |

OTHER PUBLICATIONS

Website, Electronicstalk, Convertors tackle power supply sequencing, Mar. 20, 2003, http://www.electronicstalk.com/news/tex/tex418.html.
Dallas MAXIM Semiconductor, Multiple Output Power Supplies with Output Sequencing, Application Note 841:Nov. 1, 2001.

* cited by examiner

*Primary Examiner*—Robert L. Deberadinis
(74) *Attorney, Agent, or Firm*—Oral Caglar, Esq.

(57) ABSTRACT

A packaged power supply device (10) is configured to output multiple supply voltages, which are converted from a single input voltage ($V_{IN}$). The packaged power supply device may can be configured as a DC/DC converter, which is operable to output each of the output supply voltages in a sequential manner, in accordance's with power up sequencing requirements of a processor-based system. The sequential output supply voltages may include: a fixed core supply voltage, a programmable core supply voltage, an input/output (I/O) supply voltage, and a logic supply voltage. These output supply voltages might be converted from an input voltage $V_{IN}$, which has a wide continuous operational range (e.g., 14-50 $V_{DC}$).

25 Claims, 3 Drawing Sheets

MULTI-OUTPUT POWER SUPPLY DEVICE FOR POWER SEQUENCING

This invention was made with Government support under Contract No. N00019-02-C-3002 awarded by the United States Navy. The Government has certain rights in this invention.

FIELD OF THE INVENTION

The present invention relates to a packaged device for generating multiple power supplies.

BACKGROUND OF THE INVENTION

In many systems utilizing a microprocessor and/or field-programmable gate array (FPGA), multiple supply voltages are needed. For example, a microprocessor-based system may require separate supply voltages for the input/output (I/O) logic circuits (also referred to as the "logic outer ring") and the processor core. Typically, the I/O circuitry requires a 3.3 volt DC supply, while the microprocessor requires a 1.5 volt DC supply. If the system also (or alternatively) includes an FPGA, the FPGA core may require a 2.5 volt DC supply.

Furthermore, such processor-based systems may have particular power sequencing requirements to be followed during power-up and power-down operations. For example, in microprocessor-based systems, most control logic originates in the processor core. According, if the I/O circuitries were powered up before the processor core, the I/O pins of both the processor and peripheral devices may simultaneously be configured as outputs, thereby contending with one another for the control of the bus. This may cause excessive current to flow between the processor and peripheral devices.

Also, a microprocessor core is separated from the I/O circuitry by certain isolation structures. Powering up the I/O before the core may cause current to flow between these structures, thereby reducing the operating life of the reliability of the system. Thus, it is important that the microprocessor core supply is powered up before the I/O supply.

In microprocessor and FPGA systems, it is also important to bring the core and I/O voltages supplies to their normal operating levels in a timely manner. This limits the in-rush currents occurring at power-up, thereby reducing stress on various components in the system (e.g., transition and filter capacitors).

In order to control the power supplies to the core and logic outer ring, various conventional systems utilize dual output control devices based on linear regulators. However, linear regulators are inefficient because they experience high thermal losses and have no tracking abilities. Other types of conventional power control devices consist of dual output DC/DC converters. However, conventional converters, do not perform sequencing on their outputs, and therefore require additional circuitry to implement power sequencing.

SUMMARY OF THE INVENTION

Exemplary embodiments of the present invention provide a packaged power supply device for producing multiple supply voltages from a single input voltage.

According to the exemplary embodiment, the package power supply device is operable to output both fixed and programmable core supply voltages, in addition to an input/output (I/O) supply voltage and a logic supply voltage. The programmable core supply voltage may be programmed to have a specified level.

According to an exemplary embodiment, the packaged device outputs the supply voltages according to a predetermined sequence. This sequence may correspond to the power sequence requirements of a processing device, e.g., a microprocessor or a field-programmable gate array (FPGA).

In an exemplary embodiment, the power sequencing requirements may require the core supply voltage to be up before the I/O supply voltage. In a further exemplary embodiment, the power sequencing requirements may require the core supply voltage to be turned off after the I/O supply voltage. Such exemplary embodiments may help prevent bus contention between the peripherals and the processing device core in a system, reduce the stress on components by limiting in-rush currents at start-up, and prevent current flow from occurring in the isolation structures between the processing core and the I/O circuitry.

According to an exemplary embodiment, the packaged power supply device may be configured as a DC/DC converter. In an exemplary embodiment, the DC/DC converter may be operable to receive an input voltage $V_{IN}$ within a wide range of voltages. In exemplary embodiments, the DC/DC converter may be operable to convert an input voltage $V_{IN}$ within a continuous operational range of for example, approximately 14-50 $V_{DC}$ to the various output supply voltages in a sequential manner.

Further extension in the scope and acquitability of the present invention would become apparent from the detailed description provided below. However it should be understood that the detailed description and specific embodiments herein, while disclosing exemplary embodiments of the present invention, are provided for purposes of illustration only.

BRIEF DESCRIPTION OF THE DRAWINGS

A more complete understanding of the present invention of the apparent from the following description taken in conjunction with the accompanying drawings, wherein.

DETAILED DESCRIPTION OF EXEMPLARY EMBODIMENTS

Exemplary embodiments of the present invention are disclosed in the following description. The present invention is directed to a packaged power supply device capable of outputting multiple supplies according to a sequencing scheme.

Figure 1:
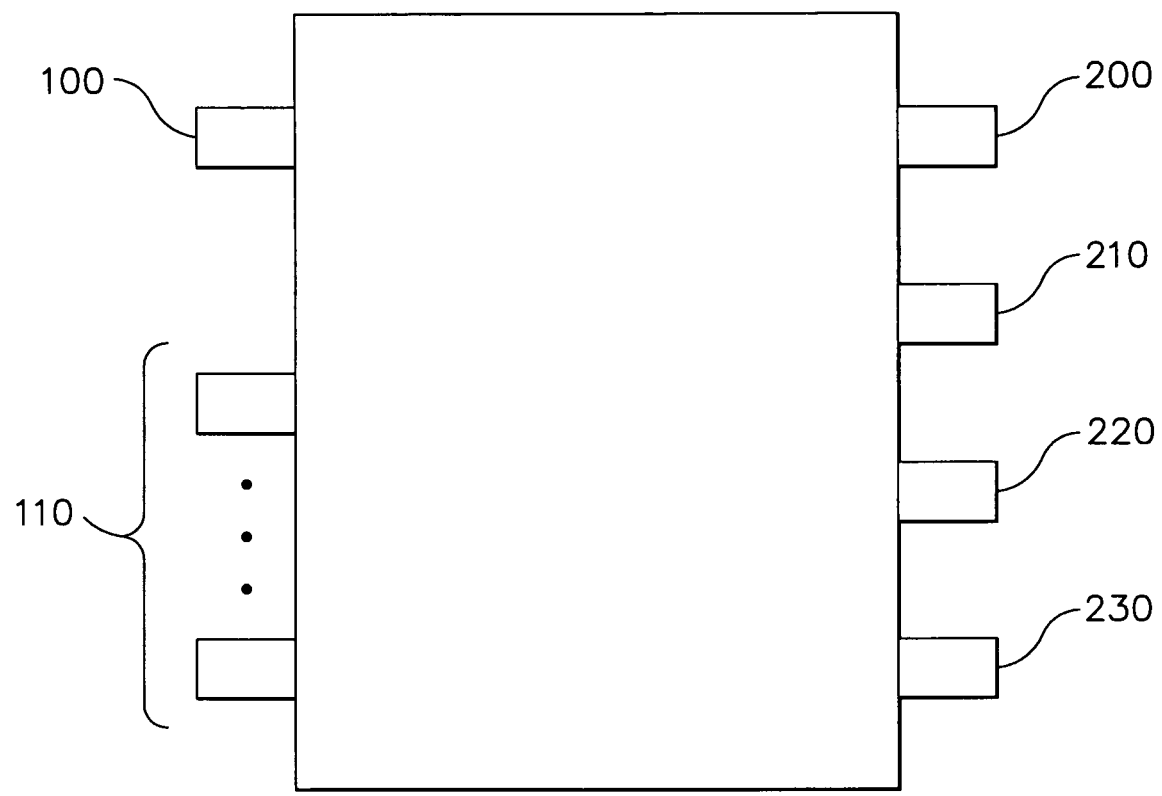
FIG. 1 is a block diagram illustrating a packaged power supply device, according to the exemplary embodiment of the present invention.

FIG. 1 is a block diagram illustrating a packaged supply device according to an exemplary embodiment. As shown in FIG. 1, a packaged power supply device 10 includes an input terminal 100 for receiving an input voltage $V_{IN}$ and a plurality of output terminals 200, 210, 220, 230. Each of the output terminals 200 to 230 is configured to output a supply voltage to a processor-based system, e.g., a system utilizing a microprocessor or field-programmable gate array (FPGA).

According to an exemplary embodiment, the package device 10 is manufactured as a DC/DC converter. In addition to the input voltage terminal 100, the DC/DC converter 10 may also include a plurality of input terminals 110 for receiving various input control signals commonly applied to DC/DC converter circuits. Such terminals 110 may include terminals for receiving INHIBIT, INPUT RETURN, CASE, TRIM, and OUTPUT RETURN signals. This list is not meant to be an exhaustive list of the terminal inputs. The DC/DC converter 10 may include any configuration of inputs terminals 110, as well as additional output terminals (not shown), which will be readily contemplated by those ordinary skilled in the art to be included in a DC/DC converter.

According to the exemplary embodiment, the DC/DC converter 10 is configured to receive at terminal 100 a DC input voltage $V_{IN}$ having a continuous range of 14-50 volts ($V_{DC}$). According to a further exemplary embodiment, the DC/DC converter 10 may be configured to receive a voltage input $V_{IN}$ having a level up to 80 $V_{DC}$ with a 1-second transient.

Referring to FIG. 1, each of the terminals 200, 210, 220 and 230 are each operable to output a supply voltage.

According to an exemplary embodiment, terminal 200 is configured to output a logic supply voltage whose level is substantially 5 $V_{DC}$ (e.g., the voltage may have a tolerance range of 4.75-5.25 $V_{DC}$). Thus, terminal 200 may be configured to provide a signal consistent with the "high" level associated with logic circuitry in the system being supplied.

Output terminal 210 may be configured to output the supply voltage for the outer ring of the processing system, i.e., the I/O circuitry, according to an exemplary embodiment. For example, for a processing system operating in a range of 66-100 MHz, the I/O supply voltage output by terminal 210 may be at a level of 3.3 $V_{DC}$ (e.g., a tolerance range of 3.1-3.5 $V_{DC}$).

In an exemplary embodiment, output terminal 220 may be configured to output a fixed supply voltage signal to the core of a processing device in the system. For instance, in order to provide a supply voltage to a FPGA operating at a frequency of 66-100 MHz, the fixed core supply voltage from terminal 220 may have a level substantially equal 2.5 $V_{DC}$ (e.g., a tolerance range of 2.35-2.65 $V_{DC}$).

Output terminal 230 may be configured to output a programmable voltage to the core of processor. For instance, the DC/DC converter 10 may be configured to receive a TRIM control signal at one of the terminals 110. The TRIM voltage may be used to program the level of the output voltage from terminal 230. (For example, the TRIM may specify an amount by which a maximum level should be decreased or "trimmed.")

According to an exemplary embodiment, the DC/DC converter 10 is configured so that this programmable core supply voltage may be set at a level within a range of approximately 0.9-2.2 $V_{DC}$. Thus, the programmable core supply voltage may be set at a level suitable for processors operating at relatively high frequencies, including next-generation microprocessors. For example, the DC/DC converter 10 may be programmed (using the TRIM) to supply an output voltage of 1.5 $V_{DC}$ to a central processing unit of (CPU) operating at 300 MHz.

The use of a TRIM to preset the voltage level of the programmable supply voltage in a DC/DC converter is generally known to those of ordinary skill in the art. Further, it will be ready apparent to those of ordinary skill in the art how to determine an appropriate voltage level based on the type of microprocessor being supplied by the programmable core supply voltage.

Although above exemplary embodiments describe the packaged power supply device 10 as being a DC/DC converter, the present invention is not thus limited. The device 10 may be configured as other types of packaged power supply circuits without departing from the spirit and scope of the present invention.

According to an exemplary embodiment of the present invention, the packaged power supply device 10 is configured to output the various supply voltages from the output terminals 200, 210, 220, and 230 according to a sequence used to meet the power up and power down sequencing requirements for the supplied computer system. As described above, such power up sequencing generally requires that the core of a microprocessor be powered up before the I/O circuitry in the system. Furthermore, power up sequencing usually requires the logic devices to be powered up after a microprocessor core, the I/O circuitry, and the FPGA core in a system.

Power down of the system is generally performed according to an opposite sequence with respect to power up. In other words, the logic devices are generally powered down first, and then the FPGA core and I/O circuitry are powered down. The processor core is powered down last.

According to a further exemplary embodiment, the packaged power supply device 10 may be configured to implement voltage tracking between two or more of the voltages output from terminals 200, 210, 220, and 230.

For example, in addition to power sequencing requirements, a processor-based system may have a voltage tracking requirement that the I/O supply voltage not differ from the microprocessor core supply voltage by more than a predetermined amount (e.g., 2.0-2.5 volts) during power up or power down.

Thus, in an exemplary embodiment, the packaged power supply device 10 may be configured so that each of the programmable core supply voltage (output from terminal 220) tracks the I/O supply voltage (output from terminal 210). In such an exemplary embodiment, the supply voltage output from terminal 220 may not be allowed to differ from the supply voltage output from terminal 210 by a predetermined amount (e.g., 2.0 $V_{DC}$) during all stages of operation.

It will be readily apparent to those of ordinary skill in the art how to design and configure a multi-output DC/DC converter 10 (and other types of packaged multi-power supply devices) to implement such voltage tracking, without undue effort or experimentation.

According to other exemplary embodiments, the fixed supply voltage and/or the logic supply voltage may be configured to track other supply voltages output by the device 10, as will be readily contemplated by those of ordinary skill in the art.

Figure 2:
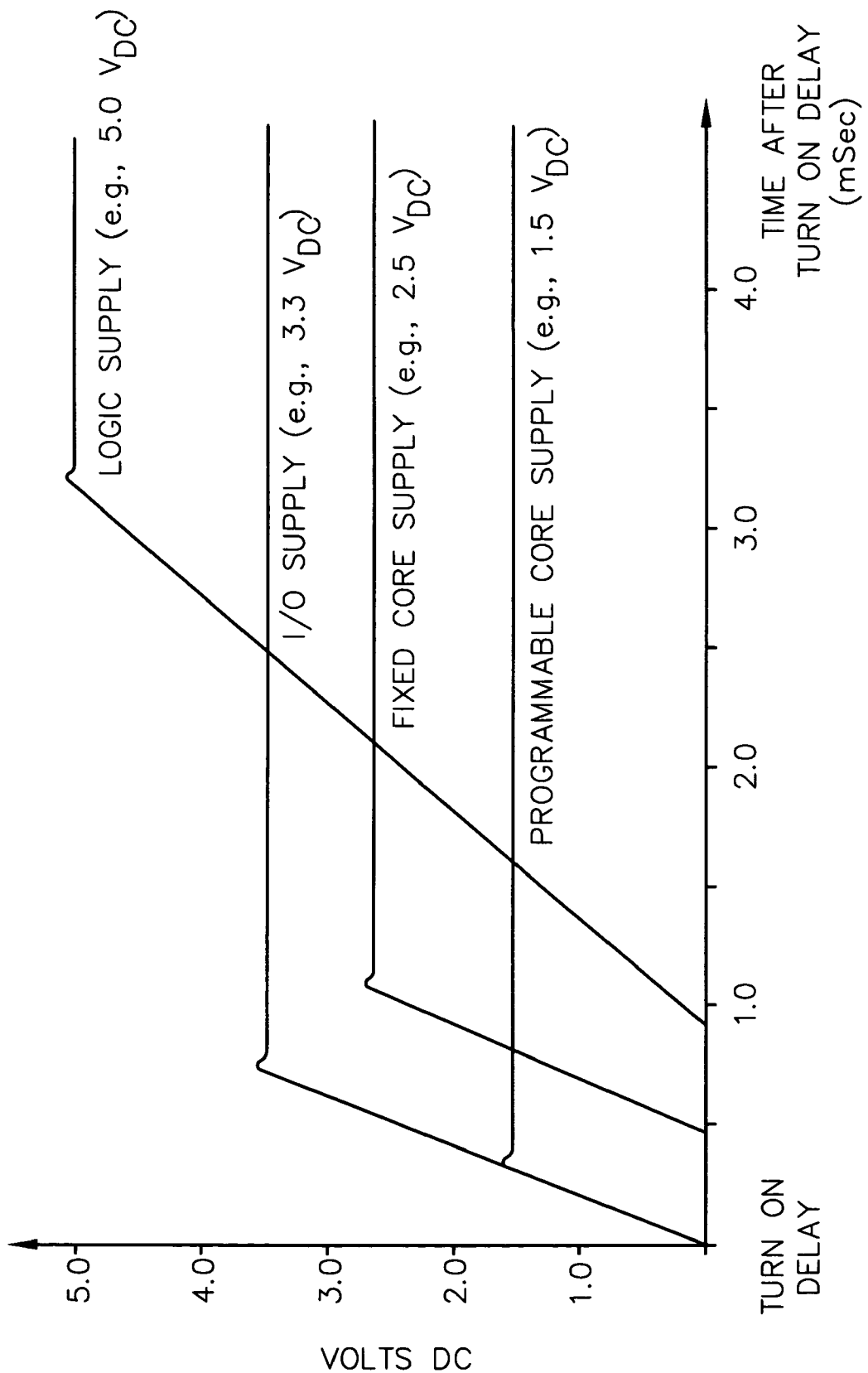
FIG. 2 is a timing diagram illustrating power up sequencing, according to an exemplary embodiment of the present invention.

FIG. 2 is a timing diagram of the supply voltage signals output by the packaged power supply device 10 according to power up sequencing in an exemplary embodiment. In particular, FIG. 2 shows an exemplary embodiment in which the programmable core supply voltage is set for a level of 1.5 $V_{DC}$. It should be noted that FIG. 2 is merely intended to illustrate the sequence at which the supply voltages are output from the packaged power supply device 10. The rising rates, voltages, and timing parameters shown for the supply voltages in FIG. 2 are in no way intended to limit the present invention. The device 10 may implement various rising rates, levels, and timings for the output signals, as will be contemplated by those of ordinary skill in the art.

As illustrated in FIG. 2, terminals 210 and 220 start outputting the I/O and programmable core supply voltages, respectively, some predetermined time after the input voltage signal $V_{IN}$ is applied to terminal 100. This predetermined time, referred to as "turn-on delay," may be set in the range of 20 to 150 mSec after $V_{IN}$ is applied.

FIG. 2 illustrates the programmable core supply voltage and I/O supply voltage being output at the same start time and tracking each other (i.e., both the programmable core supply voltage and the I/O supply voltage turn on and rise simultaneously). There may also be a case in an embodiment where both the fixed and programmable core supply voltages track the I/O supply voltage. However, FIG. 2 is merely illustrative of a certain embodiment, and it should be understood that the fixed core supply voltage may be configured with different start times.

Referring to FIG. 2, the packaged power supply device 10 is configured to output the I/O supply voltage from terminal 210 simultaneously with the programmable supply voltage, such that the I/O supply voltage reaches its full level after the programmable core supply voltage, even though both have an identical rising rate.

Although FIG. 2 illustrates that the device 10 begins the fixed core supply voltage some time after the turn-on delay, it will be apparent to those ordinary skill in the art that the invention is not thus limited.

As illustrated in FIG. 2, power up sequencing is performed so that the logic supply voltage is turned on after the core supply voltages and the I/O supply voltage. In an alternative exemplary embodiment, the device 10 may start outputting the logic supply voltage at substantially the same time as one or more of the other supply voltages, but at a decreased rising rate. According to this decreased rate, the logic supply voltage may power up the logic circuitry after the processor cores and I/O blocks and, thus, satisfy the power sequencing requirements.

In exemplary embodiments of the present invention, the terminals 200, 210, 220, and 230 may be configured to output their respective supply voltages based on other powering up sequencing requirements. For example, these other sequencing requirements may include a time interval (e.g., 1 millisecond) following the turn-on delay in which each of the output power supply voltages must be initially turned on. Another power up sequencing requirement may include a predetermined time by which each voltage supply must settle within 1 percent of its final voltage level (e.g., 4.25 mSec after the turn-on delay).

As shown in FIG. 2, each of the supply voltages output from terminals 200, 210, 220, and 230 during power up may experience an overshoot as it approaches the final level. In an exemplary embodiment, the overshoot of each of the output supply voltages signals may be limited to a predetermined amount (e.g., between 150-300 mV above the final voltage level). Furthermore, a different maximum overshoot may be specified for each of the supply voltages.

According to an exemplary embodiment, the packaged power supply device 10 is operable to output the supply voltages at the proper levels, and in the proper sequence, for any input voltage $V_{IN}$ whose level is within the continuous operational range of approximately 14-50 $V_{DC}$. In a further exemplary embodiment, the power supply device 10 may be configured to satisfy one or more of the other power sequencing requirements described above in connection with FIG. 2 as long as the input voltage $V_{IN}$ stays within this continuous operational range.

Figure 3:
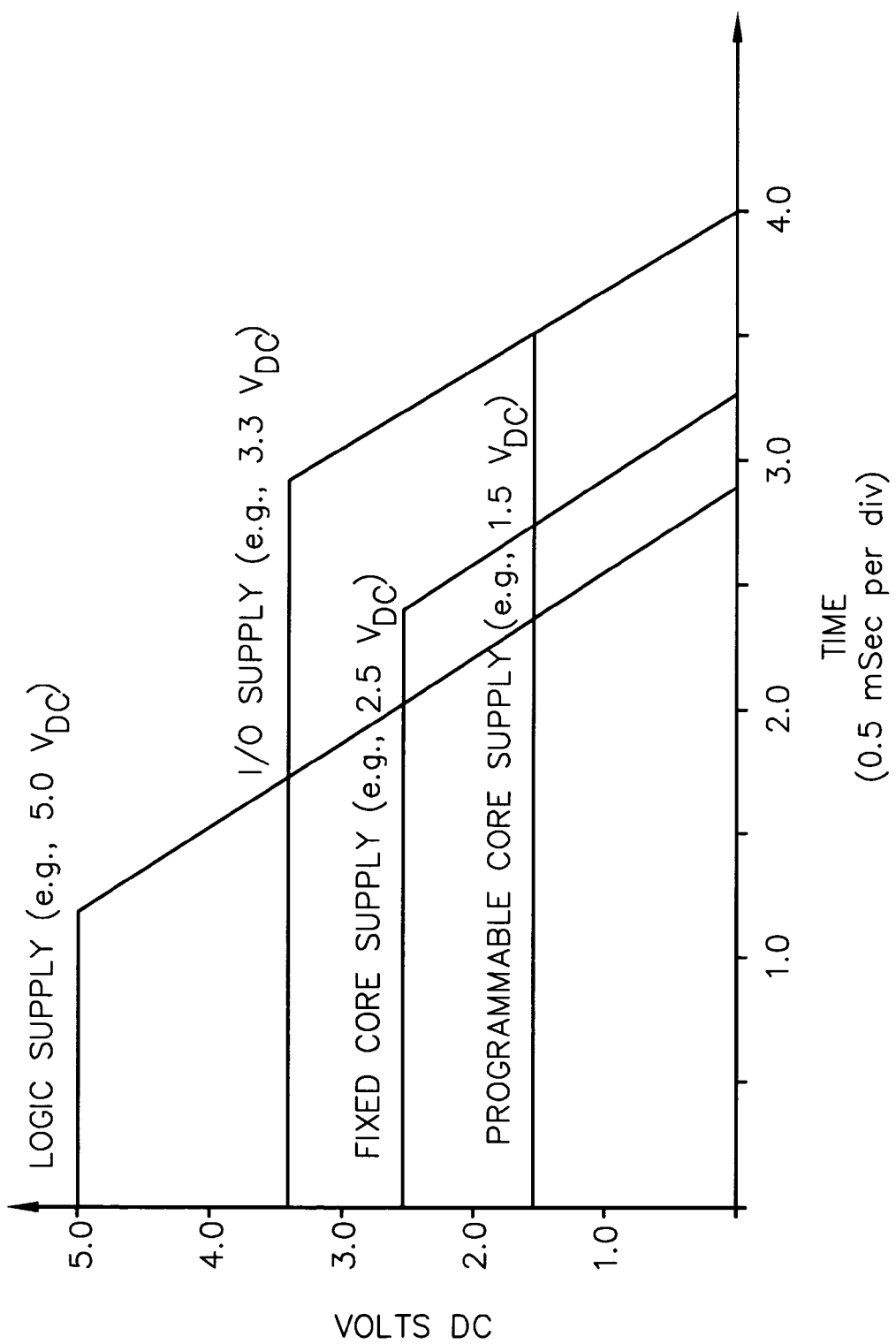
FIG. 3 is a timing diagram illustrating power down sequencing, according to an exemplary embodiment of the present invention.

FIG. 3 is a timing diagram illustrating power down sequencing of the output supply voltages, according to an exemplary embodiment. As shown in FIG. 3, the respective output supply voltages are turned off in the opposite sequence at which they are turned on during power up. In other words, the logic supply voltage is powered down first, followed by the fixed core supply voltage, and then both the programmable core supply voltage and the I/O supply voltage.

It should be understood that FIG. 3 is for purposes of illustration only. Particularly, FIG. 3 is used to show the sequence of turning off the supply voltages when the supplied system is powered down. Thus, the voltages level, descent rates, and timing parameters in FIG. 3 should in no way limit the power down operations of the present invention. The packaged power supply device 10 may implement various descent rates, levels, and timings, as will be contemplated by those ordinary skill in the art.

It will be readily apparent to those of ordinary skill in the art how to configure a DC/DC converter 10 (or other types of packaged devices) to convert a single input voltage $V_{IN}$, into the four sequential output supply voltages meeting any and all of the power sequencing conditions described above. Furthermore, it will be within the skill level of those of ordinary skill in the art to convert these output supply voltages from the input voltage $V_{IN}$ having a continuous operational range of approximately 14-50 $V_{DC}$, without undue experimentation.

According to the above exemplary embodiments, a packaged power supply device 10 may be configured as a DC/DC converter for outputting each of a logic supply voltage, I/O supply voltage, fixed core supply voltage and a programmable core supply voltage according to power up and power down sequencing. Such a device 10 may be used to supply various types of processing systems.

For example, exemplary embodiments of the present invention may be used to supply a computer system employing one or more microprocessors, one or more FPGAs, or a combination of both. Alternatively, the present invention may be used to supply power to other types of processing systems, as will be contemplated by those of ordinary skill in the art.

The use of a DC/DC converter 10 to provide the supply voltages may be advantageous in terms of efficiency and lower thermal losses, when compared to existing power supply devices using linear regulators.

Also, an exemplary embodiment of the present invention advantageously allows up to four different supply voltages to be produced by one packaged device. Those of ordinary skill in the art will realize that the DC/DC converter 10 described in the above embodiments may be configured in a relatively small package, e.g., whose dimensions are approximately 3×1.5 inches. However the present invention is not limited to any such dimensions.

What is claimed is:

1. A DC/DC converter comprising:
a single converter comprising:
an input operable to receive a single input voltage; and
multiple voltage outputs terminals, wherein the multiple voltage outputs terminals includes a logic supply voltage, an input/output (I/O) supply voltage, a fixed core supply voltage, and a programmable core supply voltage.

2. The DC/DC converter of claim 1, wherein the fixed core supply voltage and the input/output (I/O) supply voltage are produced simultaneously.

3. The DC/DC converter of claim 1, wherein the core supply voltage and the input/output (I/O) supply voltage are turned off sequentially.

4. The DC/DC converter of claim 1, wherein the fixed core supply voltage has a programmable level.

5. The DC/DC converter of claim 1, wherein the DC/DC converter is configured so that the core supply voltage and the input/output (I/O) supply voltage track each other.

6. The DC/DC converter of claim 1, wherein the sequential power supplies include supply voltages for a processor core, wherein processor is a microprocessor.

7. The DC/DC converter of claim 6, wherein the core supply voltage has a level within a range of substantially 0.9-2.2 volts.

8. The DC/DC converter of claim 1, wherein the sequential power supplies include supply voltages for a processor core, wherein the processor is a field-programmable gate array (FPGA).

9. The DC/DC converter of claim 8, wherein the core supply voltage has a level of substantially 2.5 volts.

10. The DC/DC converter of claim 1, wherein the sequential power supplies include an outer ring supply voltage, wherein the outer ring supply voltage has a level of substantially 3.3 volts.

11. The DC/DC converter of claim 1, wherein the logic supply voltage is turned on after the fixed core supply voltage and the input/output (I/O) supply voltage are turned on.

12. The DC/DC converter of claim 11, wherein the logic supply voltage has a voltage level of substantially 5.0 volts.

13. The DC/DC converter of claim 1, wherein the single input voltage has a continuous operating range of substantially 14-50 volts at which the outputs are operable to produce the sequential power supplies.

14. A packaged power supply device comprising:
a single converter comprising:
a single input terminal operable to receive an input voltage; and
a set of output terminals, wherein the set of output terminals includes a logic supply voltage, an input/output (I/O) supply voltage, a fixed core supply voltage, and a programmable core supply voltage from the input voltage.

15. The packaged power supply device of claim 14, wherein the set of output terminals outputs at least one of the core supply voltages sequentially with respect to the I/O supply voltage, thereby implementing power sequencing for a processing system.

16. The packaged power supply device of claim 15, the processing system including a field-programmable gate array (FPGA) and I/O circuitry, wherein the set of output terminals outputs the fixed core supply voltage to the FPGA core and I/O supply voltage to the I/O circuitry, according to power sequencing requirements for the processing system.

17. The packaged power supply device of claim 16, wherein the set of output terminals implements power sequencing so as to power up the FPGA core before powering up the I/O circuitry.

18. The packaged power supply device of claim 16, wherein the set of output terminals implements power sequencing so as to power down the FPGA core after powering down the I/O circuitry.

19. The packaged power supply device of claim 15, the processing system including a microprocessor and I/O circuitry, wherein the set of output terminals outputs the programmable core supply voltage to the microprocessor core and the I/O supply voltage to the I/O circuitry according to power sequencing requirements for the processing system.

20. The packaged power supply device of claim 19, wherein the set of output terminals implements power sequencing so as to power up the microprocessor core before powering up the I/O circuitry.

21. The packaged power supply device of claim 19, wherein the set of output terminals implements power sequencing so as to power down the microprocessor core after powering down the I/O circuitry.

22. The packaged power supply device of claim 19, wherein the converter is a DC/DC converter.

23. The packaged power supply device of claim 14, wherein the input voltage has a continuous operational range of substantially 14-50 volts DC at which the set of output terminals is operable to produce the supply voltages.

24. The packaged power supply device of claim 14, wherein the converter is a DC/DC converter.

25. The packaged power supply device of claim 14, wherein the device is configured so that the produced I/O supply voltage and at least one of the produced fixed and programmable core supply voltages track each other.

* * * * *